No. 715,122. Patented Dec. 2, 1902.
A. NELSON.
CHECKING APPARATUS FOR RESTAURANTS OR THE LIKE.
(Application filed Mar. 31, 1902.)
(No Model.) 4 Sheets—Sheet 1.
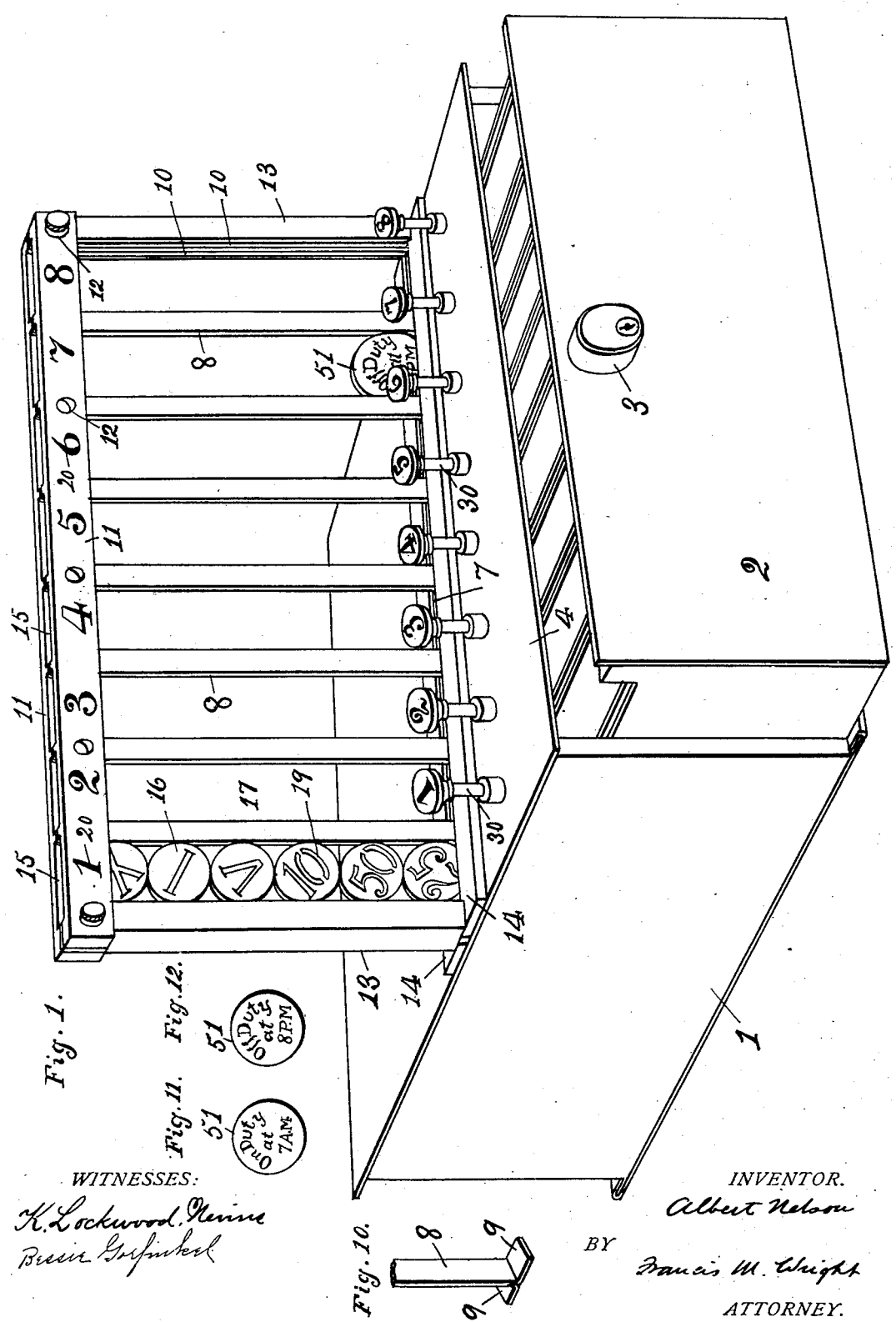
WITNESSES:
K. Lockwood Nevins
Bessie Garfinkel
INVENTOR.
Albert Nelson
BY
Francis M. Wright
ATTORNEY.

No. 715,122. Patented Dec. 2, 1902.
A. NELSON.
CHECKING APPARATUS FOR RESTAURANTS OR THE LIKE.
(Application filed Mar. 31, 1902.)
(No Model.) 4 Sheets—Sheet 2.
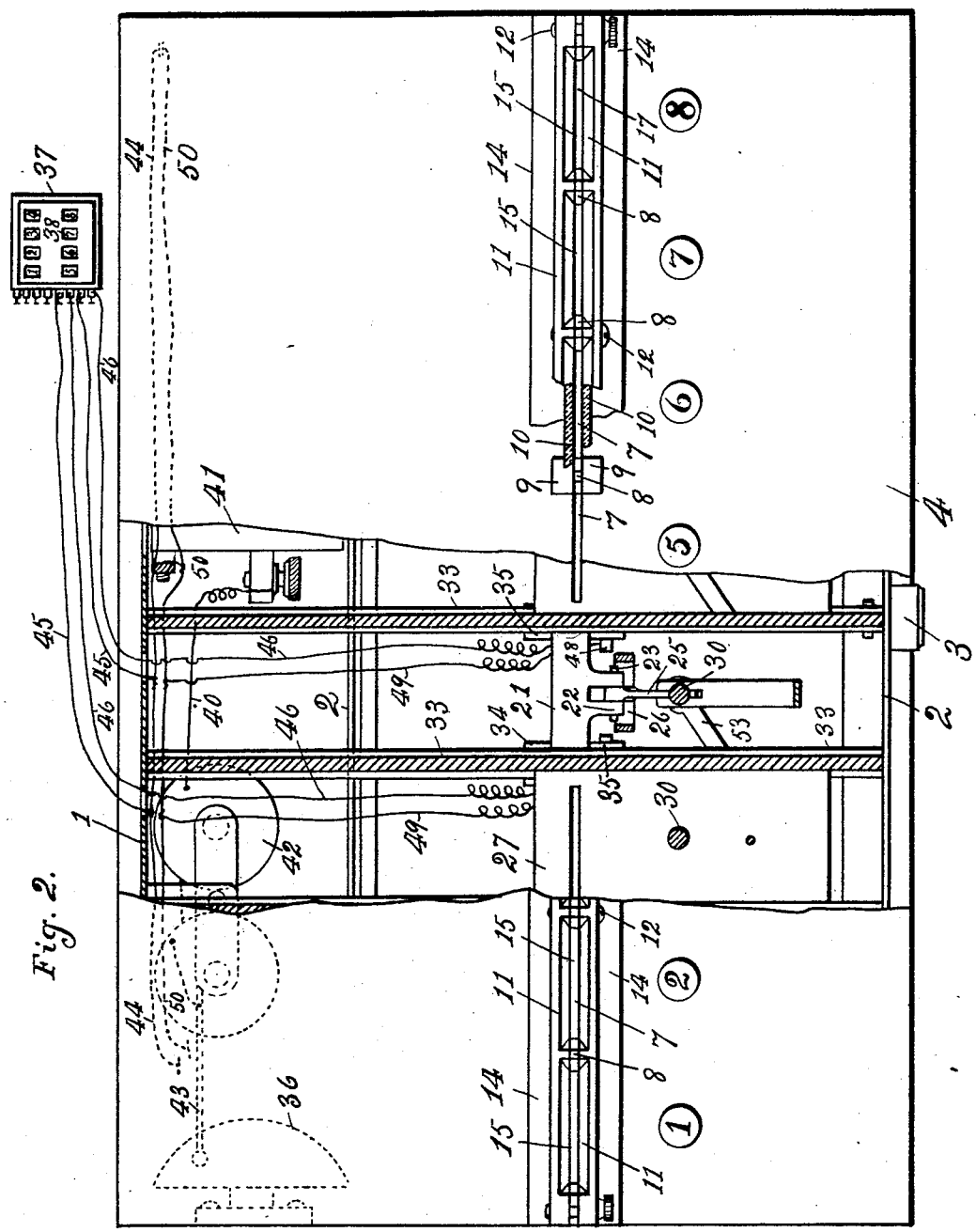
WITNESSES:
K. Lockwood Nevins.
Buier Gorfinkel
INVENTOR.
Albert Nelson
BY
Francis M. Wright.
ATTORNEY.

No. 715,122. Patented Dec. 2, 1902.
A. NELSON.
CHECKING APPARATUS FOR RESTAURANTS OR THE LIKE.
(Application filed Mar. 31, 1902.)
(No Model.) 4 Sheets—Sheet 3.
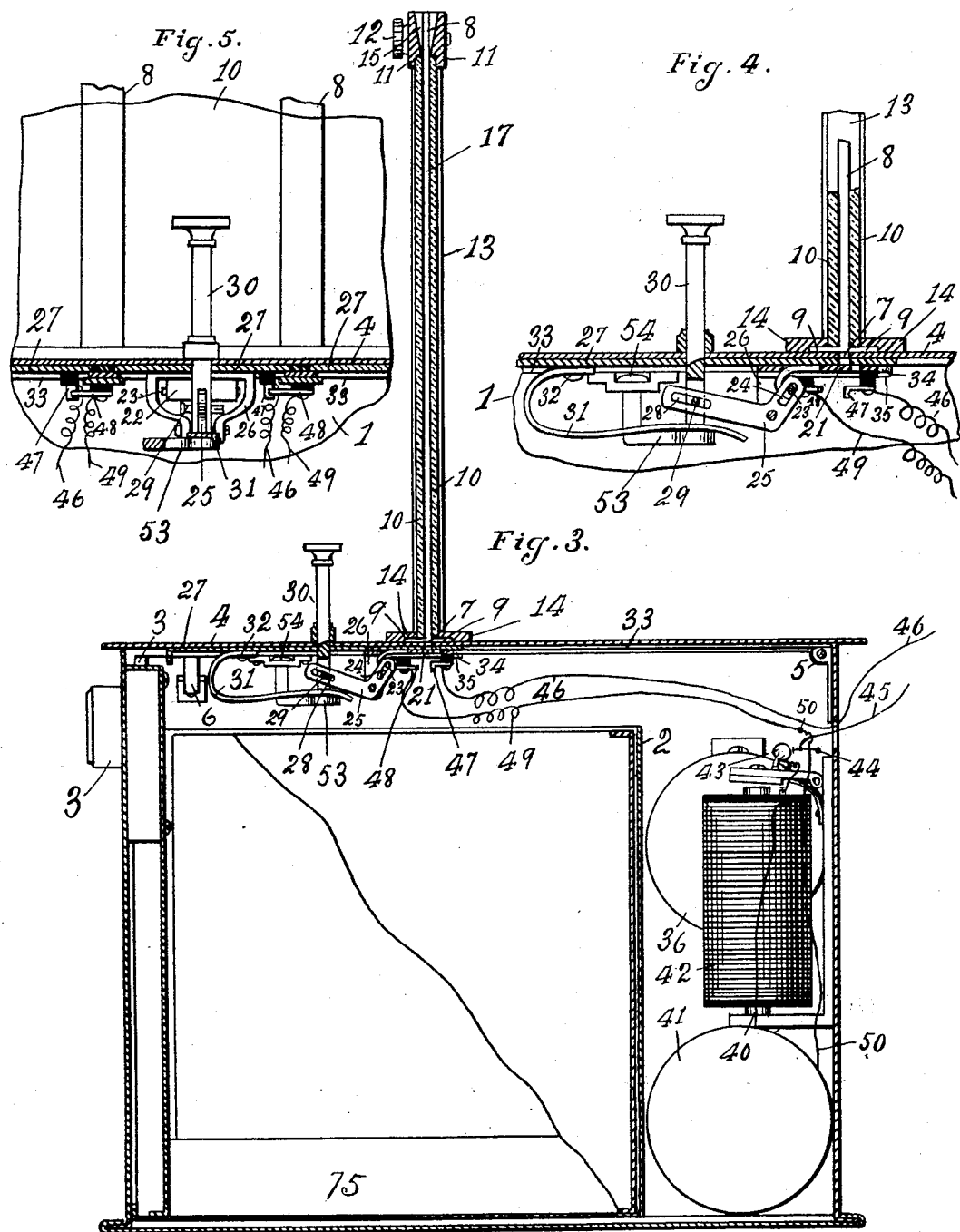
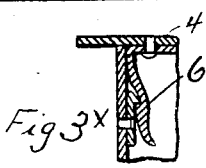
WITNESSES:
INVENTOR.
Albert Nelson
BY
Francis M. Wright.
ATTORNEY.

No. 715,122. Patented Dec. 2, 1902.
A. NELSON.
CHECKING APPARATUS FOR RESTAURANTS OR THE LIKE.
(Application filed Mar. 31, 1902.)
(No Model.) 4 Sheets—Sheet 4.
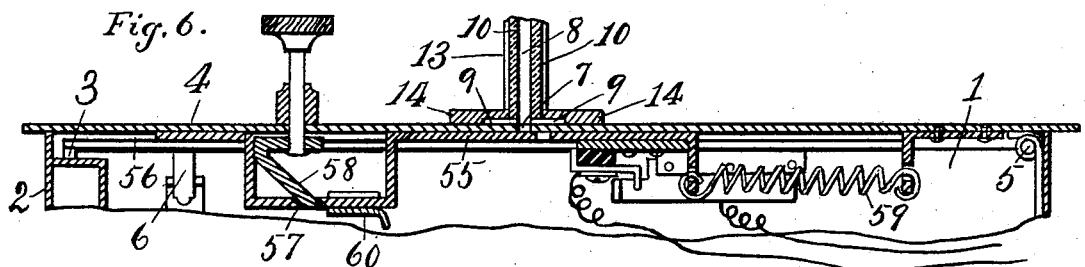
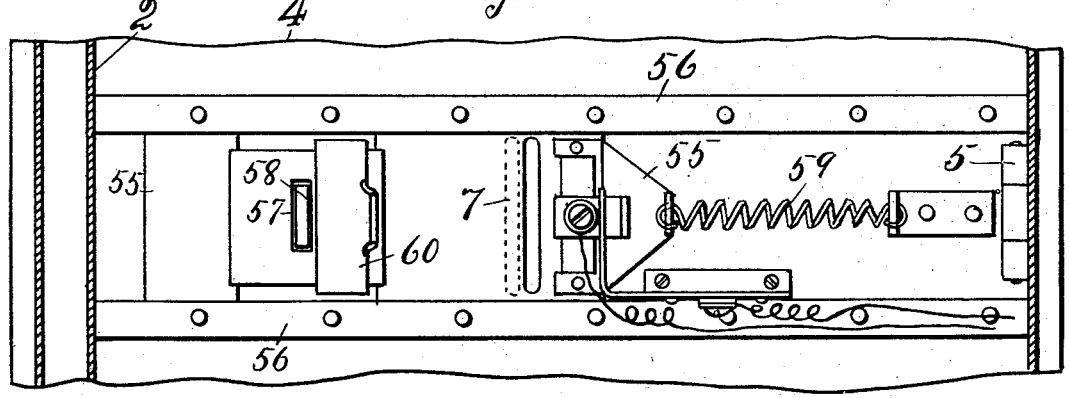
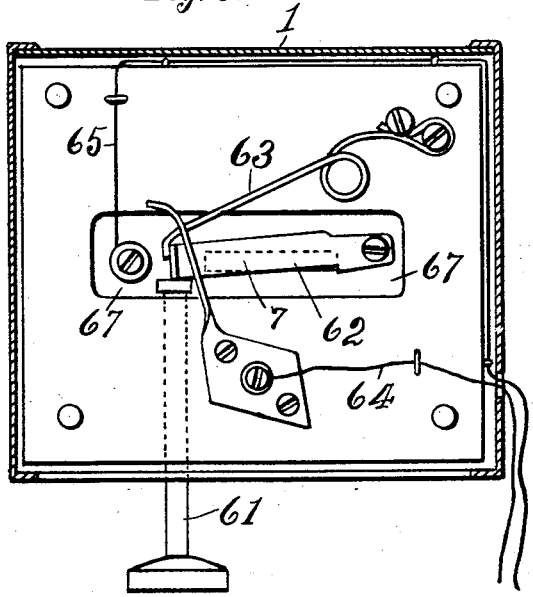
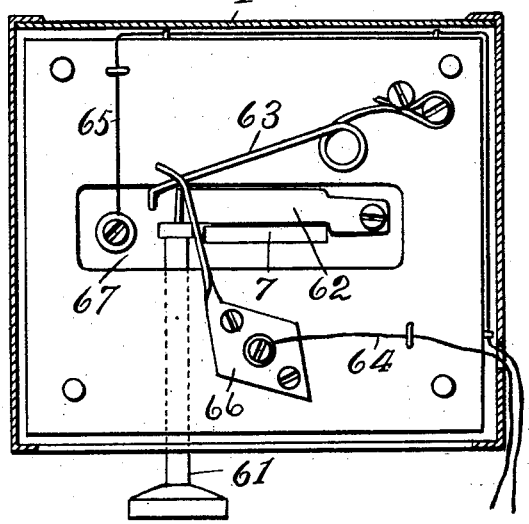
WITNESSES:
K. Lockwood Nevins.
Bessie Gorfinkel
INVENTOR.
Albert Nelson
BY
Francis M. Wright.
ATTORNEY.

UNITED STATES PATENT OFFICE.

ALBERT NELSON, OF SAN FRANCISCO, CALIFORNIA.

CHECKING APPARATUS FOR RESTAURANTS OR THE LIKE.

SPECIFICATION forming part of Letters Patent No. 715,122, dated December 2, 1902.

Application filed March 31, 1902. Serial No. 101,516. (No model.)

*To all whom it may concern:*

Be it known that I, ALBERT NELSON, a subject of the King of Sweden and Norway, residing at San Francisco, in the county of San Francisco and State of California, have invented certain new and useful Improvements in Checking Apparatus for Restaurants or the Like, of which the following is a specification.

My invention relates to an apparatus for controlling the payment of checks or money-tokens for restaurants or in similar places, the object of my invention being to provide an apparatus of this character by means of which payment for articles passed out of a restaurant-kitchen or other place may be checked and controlled, so as to prevent fraud on the part of the employees in receiving such articles by avoiding payment of the same or by paying smaller amounts than are due.

It is my object to provide an apparatus of this character by means of which notice shall be given to the proprietor or manager of the establishment when a waiter or other employee makes such a payment, whereupon such proprietor or manager shall be afforded an opportunity of readily inspecting the amount of such payment before it is deposited in the receptacle therefor, which shall permit of the proprietor or manager readily ascertaining at any time the total amount paid in by the waiter or other employee and which shall be cheap and simple in construction and not liable to get out of order.

In the accompanying drawings, Figure 1 is a perspective rear view of my improved apparatus. Fig. 2 is a broken plan view of the same. Fig. 3 is a vertical transverse section of the same. Fig. $3^{\times}$ is a detail showing the catch for holding down the cover. Fig. 4 is an enlarged vertical detail section. Fig. 5 is an enlarged vertical longitudinal section. Fig. 6 is a broken vertical transverse section showing a modified form of the invention. Fig. 7 is a broken bottom plan detail view of said modification. Fig. 8 is a bottom plan view of a further modification. Fig. 9 is a similar view showing the latter after the key has been operated. Fig. 10 is a detail of the spacing-strip, and Figs. 11 and 12 are views of opposite sides of a "starter-check."

Referring to the drawings, 1 represents an oblong box, in which slides a drawer 2, provided with a lock 3, locking into the cover 4. Said cover is hinged, as shown at 5, to the front side of the box and when closed is held down by means of spring-catches 6 at the ends thereof, as shown in Figs. 3 and $3^{\times}$. In said cover is formed a longitudinal series of slots 7 in line with each other, and upon the top of the cover between said slots are erected spacing-strips 8. Said strips are secured upon said cover by their ends being split or sawed down to a suitable distance, said ends 9 being bent at right angles to said strips and soldered to the top of the cover, as shown in Figs. 4 and 10. Upon said extended ends are now laid two sheets of glass 10, one on each side of the strips. Upon the upper edges of said sheets of glass are top plates 11, rabbeted on their under sides to rest upon the glass, and said top plates are secured together by means of screws 12 passed therethrough and through the upper ends of the spacing-strips 8. Around the ends of the sheets of glass are secured channel-pieces 13, and against the lower edges of said sheets of glass and over the bent ends 9 of the spacing-strips are foot-plates 14, soldered onto said cover. The inner sides of the top plates are beveled or converge inwardly, as likewise with the edges of the upper ends of the spacing-strips, thereby forming convenient mouths 15 for inserting checks 16 in the chutes 17, formed by the strips of glass and spacing-strips. Said checks 16 are of uniform diameter, substantially of the width of the chutes 17, and represent different denominations of money, being stamped out, as shown at 19, to distinguish the different denominations from each other. They may also be varied in peripheral configuration. They may also be stamped with a name to designate the restaurant or other places for which they are to be used. When the waiter fills an order from the kitchen, he will hand to the checker or person having charge of the apparatus the proper number of checks, and the checker will thereupon deposit them in the chute designated by the waiter's number, marked on the outside of the mouth of the chute, as shown at 20, or the waiter may himself deposit said checks in the chute. Said checks deposited in said chute by the waiter fall to the bottom thereof and rest upon a slide 21, the rear end of which is bent around to form a knuckle 22, having a pin 23 therein, which works in a slot 24 in the arm of a bell-crank lever 25, pivoted in a hanger 26, supported upon a plate 27, the other arm of said lever having a slot 28, which engages a pin 29 in the lower end of a stem 30 of a finger-key, normally pressed upward by means of a spring 31, secured, as shown at 32, on said plate 27. The plate 27 slides in guides formed by the underhanging portions of transverse strips 33, extending across the under side of the cover, so that the plate 27 can be readily inserted and withdrawn, carrying with it the principal part of the mechanism for the corresponding chute. After the plate 27 is inserted the stem 30 is inserted through the top and is withdrawn before withdrawing the plate. The slide 21, which closes the slot 7, moves in guides 34, formed by short pieces 35, soldered onto the under side of said transverse strips 33. Thus after the checks have been deposited in the chute and the checker or other person having charge of the apparatus depresses the stem 30, thereby moving said slide rearwardly, the checks are allowed to drop from the chute into a box directly underneath, there being one such box for every chute, said boxes being contained within said drawer and separated from each other by low transverse walls or partitions 75 therein.

In the front portion of the box I provide means whereby when a key is depressed in order to permit the checks to fall into the corresponding box a bell 36 is rung in the apparatus, and I also provide an annunciator 37 at a distant point having a series of indicators 38, corresponding with the keys of the apparatus and operated like those of hotel-annunciators. For this purpose a wire 40 runs from one pole of the cell 41 to the electromagnets 42 of the electric bell 36, passing around said magnets to the hammer 43 of said bell, thence through said hammer to the terminal of a wire 44, which runs along the front side of the box the whole length thereof, from which extend branch wires 45 to the several magnets of the annunciator 37, returning by wires 46 to sliding contacts 47, carried by the slides 21, which when the slot is open come into contact with fixed contacts 48, connected by wires 49 with a second wire 50, running the whole length of the front of the box and connected with the other pole of the cell. Thus when any key is depressed the circuit is closed between the fixed contact 48 and the sliding contact 47, corresponding to that key, the bell 36 in the box is rung, and at the same time the indicator of the annunciator is operated corresponding to said key. The person having charge of the apparatus will, however, not at once depress the key and allow the checks to drop into the box, but they will remain in said chute until the waiter returns with a succeeding order. They will thus for a considerable time be in plain view of the proprietor or manager of the restaurant, who can at a glance in passing the apparatus notice the amount of the order as represented by the checks paid in by the waiter and observe whether said amount agrees with the quantity of food taken from the kitchen. When the waiter returns with another order, the person having charge of the apparatus will then depress the corresponding key, permitting the checks of the previous order to drop into the box, and at the same time ringing a bell and causing the annunciator having the number of that waiter thereon to be actuated. The annunciator will be placed in a position convenient for observation by the proprietor or manager, who will thus, when a waiter comes from the kitchen with an order, see whether said checker or waiter has dropped checks into the chute. The waiter will have to wait until the checks for the previous order have been dropped into the box before dropping the succeeding checks, and when that is done a bell is rung and the annunciator is operated. At any time the manager can unlock the drawer and remove the boxes for the several waiters, which boxes will be numbered, and count the checks therein, and the waiters will be expected to pay a total amount of money represented by the total of the checks in the box, or at the beginning of the day each waiter will be supplied with checks to a certain value—say twenty dollars—and will pay for the same in money, and at the end of the day will be expected to present the balance of the checks and will be paid therefor the corresponding balance in money. When the manager has removed the checks from the box and desires to arrange the apparatus for use for the next day, he will first deposit in the bottom of the chute of each waiter who is to be on duty the next day a check which may be termed a "starter," (shown in detail at 51,) which check will indicate on one side the time at which the waiter goes off duty and on the other side the time when the waiter comes on duty. Said starter-check will remain in the bottom of the chute with the side toward the checker which has marked thereon the words "Off duty," which words facing the checker will prevent him depressing the key of said chute by mistake for that of another waiter. Said check will remain in the bottom of the chute until the waiter brings his first order, when the person having charge of the apparatus will depress the key, permitting the starter-check to drop from the chute and ring the bell and operate the annunciator. If certain chutes and the corresponding keys are not to be used, the manager can prevent this for any key by turning beneath the stem of said key a bent stop 53, pivoted at 54 to the slide-plate 27. When the key is to be operated, the stop will be removed from beneath the key.

In the modification shown in Figs. 6 and 7 no slides 27 are used; but slides 55 to close the slots are used which move in guides 56, secured upon the under side of the cover, said slides 55 being bent into a U-shaped form beneath the keys and having slots 57 therein, through which pass vertical wedges 58, attached to the lower ends of the stems. The depression of any key thus moves its slide 55 rearwardly and opens the slot. A spring 59 retracts said slide 55 to its normal position, closing said slot. The manager can readily prevent any key from being operated by shifting a locking-plate 60 upon said U-shaped portion of the slide 55 until it comes underneath the slot in which said wedge 58 works, thereby preventing the depression of said wedge through said slot.

In the form of the invention shown in Figs. 8 and 9 the stem 61 operates horizontally through the rear side of the box instead of vertically through the cover thereof, and when pushed in a swinging shutter 62 opens the slot. A spring 63 pushes back said stem. In this modification 64 65 are the electric wires, the wire 64 connected to a spring-contact 66 and the wire 65 to the shutter 62 through the plate 67.

This apparatus can be used in other places than restaurants—as, for instance, in barber-shops, beer-saloons, cigar-counters, &c. By using nine chutes of different widths and thicknesses, corresponding with the United States coins, and a single stop for all the chutes the device can be adopted to be used with metallic currency and to indicate the amount of the last sale made.

This system of checking is very simple and effective and is especially adapted for hotels, restaurants, cafés, &c.; also, for barber-shops or any commercial business where a strict system of checking is required. For instance, as an example, in a restaurant on the European plan, where an itemized bill is used, to be paid by the waiter or guest at the cashier's desk, a separate and complete control can be kept upon all orders received by waiters from each department, kitchen, bar, or cigar-counter. In a place of this kind where eight waiters are employed an apparatus with eight chutes is required. When a waiter comes on duty, he will report at the office and will receive from the proprietor or manager his number (badge) and a check-book with the same waiter's number on each and every check issued to him; also, he will receive a certain amount of checks, sufficient to readily make his own change when paying for his order. Thus, for instance, when waiter No. 1 comes on duty and reports at office he will receive his badge, check-book, and, say, twenty dollars in checks, for which he will sign a receipt and be held responsible. The proprietor or manager will immediately upon such issue proceed to the apparatus, see that the starter 51 is in its proper place, left there from the previous day, when said waiter No. 1 went off duty, and will also unlock the drawer 2 in the box 1 and will push back the stop 53, whereby key No. 1 will be ready to operate, and waiter No. 1 is ready for business. When waiter No. 1 has an order to be filled from, say, the kitchen, he will stop at the outside of desk upon which the apparatus is placed. The person having charge of the apparatus (commonly called the "kitchen-checker") will inspect and sum up the prices of the dishes on that waiter's tray, call out the total amount of said dishes—for instance, one dollar and fifty cents—press key No. 1, whereupon the starter, if it is that waiter's first order or, otherwise, a previous order, will drop into box No. 1. The bell will ring in the apparatus, and the annunciator will operate, showing said waiter's number, "1." The total amount—one dollar and fifty cents—can with safety be deposited in the chute by the waiter or handed to the checker, who will drop the same into chute No. 1 in presence of the said waiter, where it will remain in full view until said waiter fills a succeeding order. Thus the proprietor, manager, or head-waiter can keep a strict control upon the doings of any and all waiters or other employees in their service. For instance, supposing that the bell has rung and that waiter No. 1 has brought a tray with several orders thereon into the dining-room from the kitchen, by a passing glance the proprietor or manager knows the total amount of these orders to be, say, one dollar and fifty cents, and another passing glance at chute No. 1 in the apparatus will decide whether waiter No. 1's last orders were correct or not. Thus at any time during business hours or at the end of each day before the waiters go off duty their accounts can readily be made out. For instance, at any time during business hours the checks of waiter No. 1 in the apparatus can be counted and their total amount compared by the checks or bills of said waiter No. 1 on file paid in at the cashier's desk; and when waiter No. 1 is off duty he will report at the office, turn in his check-book, badge, and all unused checks issued to him, and if found correct his receipt will be returned to him. After this the proprietor or manager will unlock the drawer in the apparatus, take from box 1 the starter, write on one side the hour off duty, and on the other side the hour on duty, and drop said starter into chute No. 1 in such a manner that "Off duty" on said starter is toward the checker or person in charge of the apparatus. The proprietor will also push the "1" stop 53 to obstruct the finger-key No. 1 and lock the drawer. This will prevent the checker from operating said key No. 1; and at any time during the day or after business hours, as the total amounts of all the checks (bills) on file at the cashier's desk must correspond with the total amount in coin in the cashier's cash-drawer, so must also the total amount of those checks or bills made out by the waiters, as well as the total amount of coin in the cashier's drawer, correspond with the total amount of all the checks in the apparatus.

As another example, in places of amusement, beer-halls, &c., where refreshments are served at tables or otherwise by waiters or other employees, commonly called "extra" waiters, generally working in such places on commission, waiter No. 1 comes to work in such a place and agrees to receive, say, ten per cent. of the gross receipts of his, waiter No. 1's, sale, such a waiter will deposit at the office a stated sum—say, ten dollars—and receive the same amount in checks. When going off duty, said waiter No. 1 will receive his wages or commission according to the total amount representing all the checks deposited in box No. 1 inside of the apparatus. Thus neither the waiter nor the barkeeper handle any of proprietor's cash or money. Again, for instance, in a barber-shop with eight chairs, where eight barbers are employed and an apparatus of eight chutes is in use, each chair has its number and each barber has a number corresponding to the chair he is attending to. Each barber is supplied with a certain amount of checks, and each check has the same number stamped thereon with the corresponding barber's number. Thus when a patron has been attended to, the barber will hand him a check representing the total amount of the bill, this check the patron will pay at the desk, the person in charge of the apparatus will press No. 1 key, ringing the bell in apparatus, drop the check or checks into chute with corresponding number as on check and annunciator. Thus there can be accurately ascertained the total amount of each barber's receipts, and if working on commission their percentage will be according to the receipts in the respective boxes.

I claim—

1. In an apparatus of the character described, the combination of a box having a slotted top, individual chutes on the top of said box, said chutes being open to inspection from the side, individual stops for the bottoms of the respective chutes, individual compartments below the chutes, and means independent of the articles deposited in the chutes for removing any stop when desired to permit the articles deposited therein to drop into the corresponding compartment, substantially as described.

2. In an apparatus of the character described, the combination of a box having a slotted top, individual chutes erected on the top of said box, said chutes having glass sides, individual stops for the bottoms of the chutes, and means independent of the articles deposited in the chutes for withdrawing any stop when desired, substantially as described.

3. In an apparatus of the character described, the combination of a box having a slotted top, individual chutes erected on said box, said chutes having glass sides, compartments in the box for the respective chutes, removable stops for closing the bottoms of the chutes, an annunciator at a distant point having indicators corresponding to the chutes, and means for simultaneously removing the stop of any chute and actuating the corresponding indicator, substantially as described.

4. In an apparatus of the character described, the combination of a box having a slotted top, individual chutes erected on said box, said chutes being of uniform diameter throughout and having glass sides, stops for the bottoms of the chutes, compartments in the box corresponding to the chutes, individual devices for withdrawing said stops to permit articles to drop from the chutes into the compartments, and means for locking said devices when desired, substantially as described.

5. In an apparatus of the character described, the combination of a box having a slotted top, a drawer therein having separate compartments, an electric battery and alarm in the front portion of the box, individual chutes erected upon the top of the box, said chutes having glass sides, stops for closing the bottoms of the chutes, individual devices for removing said stops, an annunciator at a distant point having indicators corresponding to the respective chutes, and contact-points closed by the operation of removing the stops from the bottom of the chutes, thereby closing the circuit through the battery, substantially as described.

6. In an apparatus of the character described, the combination of a box having a slotted top, chutes erected thereover, said chutes being open to inspection from the side and open at the top to deposit the checks from the outside, means for closing the bottoms of said chutes, means for removing said closures when desired, and checks suitably marked to represent different denominations of money in said chutes, said checks being of sufficient dimensions relatively to the dimensions of the chutes as to prevent passage of an upper check past a lower check in the same chute and said chutes being sufficiently tall to hold a plurality of checks at one time, whereby any desired sum of money may be represented in any chute by a vertical series of checks therein, substantially as described.

7. In an apparatus of the character described, the combination of a box having a slotted top, chutes erected on the top of said box, said chutes being open to inspection from the side, individual means for closing the bottoms of said chutes, and individual means independent of the articles deposited in the chutes for removing said closures when desired, substantially as described.

8. In an apparatus of the character described, the combination of a box having a slotted top, spacing-strips erected thereon, glass on each side of the spacing-strips forming chutes between said strips and glass, means for securing the glass at the top and bottom, means for closing the bottom of the chutes, and individual means independent of the articles deposited in the chutes for removing said closures when desired, substantially as described.

In witness whereof I have hereunto set my hand in the presence of two subscribing witnesses.

ALBERT NELSON.

Witnesses:
FRANCIS M. WRIGHT,
JOHN H. FISHER.